United States Patent [19]

Powell

[11] 4,272,496
[45] Jun. 9, 1981

[54] PROCESSING ELEMENTAL PHOSPHORUS ($P_4$) CONTAINING GAS STREAMS

[75] Inventor: William J. Powell, Butte, Mont.

[73] Assignee: Stauffer Chemical Company, Westport, Conn.

[21] Appl. No.: 107,466

[22] Filed: Dec. 26, 1979

[51] Int. Cl.³ ............................................. B01D 53/34
[52] U.S. Cl. .................................... 423/210; 423/246; 423/314; 423/323; 110/343; 431/5
[58] Field of Search ............... 423/210, 299, 304, 316, 423/246, 318, 322, 323, 415 A; 422/7–10, 12; 431/5; 44/5; 110/341–345

[56] References Cited

U.S. PATENT DOCUMENTS

| | | | |
|---|---|---|---|
| 1,089,784 | 3/1914 | Peacock | 423/316 |
| 1,592,616 | 7/1926 | Noyes et al. | 423/210 C |
| 3,310,365 | 3/1967 | Dundas et al. | 423/244 A |
| 3,767,768 | 10/1973 | Reh et al. | 423/304 |
| 3,837,820 | 9/1974 | Kukin | 44/5 |

Primary Examiner—Earl C. Thomas
Attorney, Agent, or Firm—Michael E. Zall

[57] ABSTRACT

The process of this invention provides for reducing the tendency of a carbon monoxide gas stream, containing a minor level of elemental phosphorus, to corrode metallic surfaces in a combustion zone upon combustion of the gas stream in the combustion zone to combustion gases. The process comprises, prior to combustion:

(a) cooling the gas stream to a sufficiently low temperature to condense a quantity of elemental phosphorus to produce a reduced level of elemental phsophorus in the gas stream; and (b) diluting the gas stream with an effective amount of combustible gas, wherein the effective amount of combustible gas is an amount which is effective in producing a dew point of the combustion gases, with respect to the quantity of acid, e.g. meta-phsophoric acid ($HPO_3$), produced by the combustion of the reduced level of elemental phosphorus, less than the temperature of the metallic surfaces.

8 Claims, 12 Drawing Figures

GRAPH OF DEW POINT ACID IN CO-NAT. GAS MIXTURE CONDUCTIVITY VS PROBE TEMP.

FIG.4

GRAPH OF DEW POINT ACID IN CO GAS (RUN 18)

FIG.5

GRAPH OF DEW POINT ACID IN CO-NAT. GAS MIXTURE

FIG. 7

RATE OF ACID BUILD UP CO-NAT. MAX.

FIG.8

RATE OF ACID BUILD UP CO-NAT. MIX, MgO IN OIL ADDED (RUN 29)

FIG. 9

RATE OF ACID BUILD UP CO-NAT. GAS MIX, MgO IN OIL ADDED

FIG.12

RATE OF ACID BUILD UP CO-NAT. GAS MIX, SOLID MgO ADDED

PROCESSING ELEMENTAL PHOSPHORUS ($P_4$) CONTAINING GAS STREAMS

BACKGROUND OF THE INVENTION

1. Field of the Invention

This invention relates to a process for reducing the tendency of a gas stream containing elemental phosphorus, to corrode metallic surfaces in a combustion zone upon combustion of the gas stream; particularly a gas stream containing substantially carbon monoxide, and particularly that gas stream obtained from the electric furnace production of elemental phosphorus.

2. Prior Art

In the electric furnace process for preparing phosphorus, phosphate-bearing ore, rock or earth is charged to an electric furnace with silica and carbon, usually in the form of coke or coal. The electric furnace is heated to a sufficient temperature to melt the charge. The phosphorus generated is removed as a vapor with carbon monoxide gas. The silica is used as a flux for the calcium present in the phosphate rock. An approximate equation for the over-all reaction is given by:

The gas, as it leaves the furnace entrains minute particles of carbon, phosphate rock and other materials present in the furnace. This phosphorus containing gas stream is then generally passed to a hot gas precipitator which removes a large portion of the entrained solids. The gas stream is then conveyed to a hood type condenser where the elemental phosphorus ($P_4$) is condensed, and then the gas stream exhausted through a spray tower.

In some installations, the entrained solids and dust are removed by, for example, Cottrell precipitators which are operated above the dew point of the elemental phosphorus, while in other installations the entrained solids and dust are removed by impingement. The phosphorus is often condensed in spray towers equipped with water sprayers kept at 45° C. and then run into a sump where small amounts of impurities called mud, are precipitated. The liquid phosphorus is finely pumped into storage tanks where the last pieces of mud fall to the bottom.

Typically, the gas stream emanating from such a process consists of 93% carbon monoxide, the remainder being primarily elemental phosphorus ($P_4$) with some silicon tetrafluoride and dust. The carbon monoxide may be recycled and burned in kilns used for sintering or agglomerating the phosphate bearing ore, or in other process steps.

A problem occurs when, for example, one of the kilns is not operating or the electric furnace used to heat the charge is operating at high capacity. At such times excess carbon monoxide is available for use. Currently, in most plants, this excess gas is flared to the atmosphere. A problem in utilizing this excess gas, for example, to generate steam and/or electric power in a boiler for use in the plant is that the phosphorus burns to acid, for example, meta-phosphoric acid ($HPO_3$), in the presence of water, for example:

$$P_4+2H_2O+5O_2 \rightarrow 2P_2O_5+2H_2O \rightarrow 4HPO_3$$

The acid, e.g. meta-phosphoric acid ($HPO_3$), produced is very corrosive to metallic surfaces. The acid has a high condensation temperature, or dew point. This is the primary reason that such carbon monoxide gas steams are generally not utilized in boilers to generate steam and/or electric power for the elemental phosphorus content of the carbon monoxide gas stream is such that when oxidized to acid; the acid condenses on the surface of the boilers, forming a glaze, which is highly corrosive.

To date, there is, to applicant's knowledge, no known economical, effective and practical process for reducing the elemental phosphorus content of the carbon monoxide gas stream to levels which will permit the combustion of the carbon monoxide gas stream in a combustion zone suitable for generating steam and/or electric power, said combustion zone having metallic surfaces.

OBJECTS AND SUMMARY OF THE INVENTION

It is an object of this invention to provide a process for reducing the tendency of a gas stream containing elemental phosphorus to corrode metallic surfaces upon combustion of the gas stream in a combustion zone.

It is a further object of this invention to provide a process for reducing the tendency of a carbon monoxide gas stream containing elemental phosphorus from producing such corrosion to metallic surfaces.

It is a further object of this invention to provide a process which permits the combustion of the carbon monoxide gas stream emanating from the electric furnace process for producing elemental phosphorus, with a minimum amount of corrosion of the metallic surfaces within the combustion zone.

The process of this invention provides for reducing the tendency of a carbon monoxide gas stream, containing a minor level of elemental phosphorus, to corrode metallic surfaces in a combustion zone upon combustion of the gas stream in the combustion zone to combustion gases. The process comprises, prior to combustion:

(a) cooling the gas stream to a sufficiently low temperature to condense a quantity of elemental phosphorus to produce a reduced level of elemental phosphorus in the gas stream; and (b) diluting the gas stream with an effective amount of combustible gas, wherein the effective amount of combustible gas is an amount which is effective in producing a dew point of the combustion gases, with respect to the quantity of acid, e.g. meta-phosphoric acid ($HPO_3$), produced by the combustion of the reduced level of elemental phosphorus, less than the temperature of the metallic surfaces.

The process may further comprise injecting into the combustion zone during combustion an effective amount of MgO or a compound capable of yielding MgO to neutralize the quantity of acid produced by the combustion of the reduced level of elemental phosphorus. This aspect of the invention is described and claimed in con-currently filed U.S. Ser. No. 107,479 to Powell (C-5888A).

Preferably, the low temperature to which the gas stream is cooled is less than about 10° C. and performed by intimately contacting the gas stream with cooling water. Optionally, and preferably, the gas stream is then passed through at least one mist eliminator pad to reduce the entrained water and condensed elemental phosphorus in the gas stream.

Preferably the combustible gas is natural gas. A ratio of the combustible gas to the carbon monoxide stream, by volume, of about 0.25:1 to about 3:1, or greater is effective.

This process finds particular application in processing the gas stream liberated from the electrothermal production of elemental phosphorus, i.e. a carbon monoxide gas stream containing a minor level of elemental phosphorus, however, the process may be utilized for reducing the tendency of any gas stream, containing a minor level of elemental phosphorus, to corrode metallic surfaces in a combustion zone upon combustion of the gas stream in the combustion zone.

DETAILED DESCRIPTION OF THE INVENTION

The process of this invention is used for reducing the tendency of a carbon monoxide gas stream, containing a minor level of elemental phosphorus, to corrode metallic surfaces in a combustion zone upon combustion of the gas stream in the combustion zone. This process is applicable to any gas streams containing elemental phosphorus that will be oxidized or burned. The elemental phosphorus is oxidized to acid, e.g. meta-phosphoric acid ($HPO_3$). The process is particularly applicable in burning, for the purposes of generating steam and/or electric power, the carbon monoxide gas stream liberated from the electrothermal production of elemental phosphorus.

This process is theoretically applicable to any level of elemental phosphorus contained in the gas stream. It is, however, optimally and practically used when the elemental phosphorus content is at minor levels. A minor level can generally be considered to be that level which is commonly found in a carbon monoxide gas stream which is burned in the kilns used for sintering or agglomerating the phosphate bearing ores used in the electrothermal production of phosphorus. This level is generally less than about 2 grains $P_4$/SCF (0° C. and 29.92" Hg.), but may be higher or lower.

The process of this invention is used to prevent corrosion of the metallic surfaces in the combustion zone or other zones which come in contact with the combustion gases. These metallic surfaces generally are of water tube construction and used for the generation of steam and/or electric power. If the acid produced by the combustion of the elemental phosphorus, e.g. meta-phosphoric acid ($HPO_3$), condenses on these metallic surfaces, the surfaces will corrode rapidly.

Prior to combustion of the gas stream in the combustion zone, the gas stream is cooled to a sufficiently low temperature to condense a quantity of elemental phosphorus to produce a reduced level of elemental phosphorus in the gas stream.

The gas, is preferably cooled by intimately contacting the gas stream with cooling water. This is preferably accomplished by passing the gas through a spray tower and a mist eliminator tower. The spray tower, typically contacts the gas stream in a countercurrent manner with water. The gas stream is then passed through a mist eliminator tower which, preferably, has mist eliminator pads to remove any entrained, condensed elemental phosphorus and/or water. This process, however, contemplates any method for cooling the gas stream to remove the elemental phosphorus therefrom.

It has been found that the gas stream should be cooled to a temperature of less than about 15° C. Such a temperature reduces the elemental phosphorus content of the gas stream to a level that when the phosphorus is oxidized to acid it can be conveniently diluted with an optimum amount of combustible gas. A temperature higher than about 15° C. may be utilized, however, an excessive amount of combustible gas may have to be used for dilution.

Prior to combustion and just after the cooling step, the gas stream is diluted with an effective amount of a combustible gas. The amount of combustible gas used is that amount which is effective in producing a dew point of the combustion gases, with respect to the quantity of acid produced by the combustion of the reduced level of elemental phosphorus, less than the temperature of the metallic surfaces.

It has been found that a preferred ratio of a combustible gas to the carbon monoxide gas stream, by volume, of about 0.25:1 to about 3:1, or greater is effective.

Optionally, the process may further comprise injecting into the combustion zone during combustion an effective amount of MgO or a compound capable of yielding MgO to neutralize the quantity of acid produced by the combustion of the reduced level of elemental phosphorus. This amount may vary over a wide range depending on the method and efficiency of the introduction of the compound into the boiler, for example, the range may be from about 1 to about 400 times the amount of MgO needed to neutralize the acid produced by the combustion of the reduced level of elemental phosphorus. A preferred method of introduction of the MgO or MgO compound capable of yielding MgO is injecting it in a finely divided form in admixture with the gas that is being burned in the combustion zone.

The compound capable of yielding MgO may be a carbonate or hydrate capable of yielding MgO at the temperature of combustion, e.g. above 400° F. (204° C.). The MgO or compound capable of yielding MgO is preferably in finely comminuted form or powder form.

The MgO or compound capable of yielding MgO may additionally be added to a fuel oil, for example, No. 2 Fuel Oil or water and sprayed into the burner flame. Ideally, the MgO or compound capable of yielding MgO should be in contact with the acid as it is formed or just prior to its formation. At a later time in the formation of the acid, the acid has an opportunity to condense on the metallic surfaces in the combustion zone and effective neutralization will be difficult to achieve.

It is believed that the MgO neutralizes the acid formed by the combustion of the elemental phosphorus, according to the following formula:

$MgO + HPO_3 \rightarrow MgHPO_4$

A particular advantage of the use of the MgO or compound capable of yielding MgO to neutralize the acids formed, is the fact that the ash deposited on boiler tubes and stack areas is at a pH value which does not cause corrosion of these surfaces.

It is possible to combine the diluting of the gas stream with the injecting into the combustion zone of MgO or a compound capable of yielding MgO for (a) the compound injected may be used to neutralize only a portion of the acid produced; and (b) the diluting of the gas steam may be used to raise the dew point of the remaining acid to a temperature above that of the metallic surfaces within the combustion zone. Such a system allows for the temperature of the gas stream exiting the cooling step to be at a somewhat higher temperature than would be used with either step alone and allows for the use of a lower amount of MgO or compound capable of yielding MgO or a lower amount of combustible gas for dilution.

The following examples are given to better illustrate the present invention, and are not intended to be limiting.

EXAMPLES

Description of Test Equipment

Figure 1:
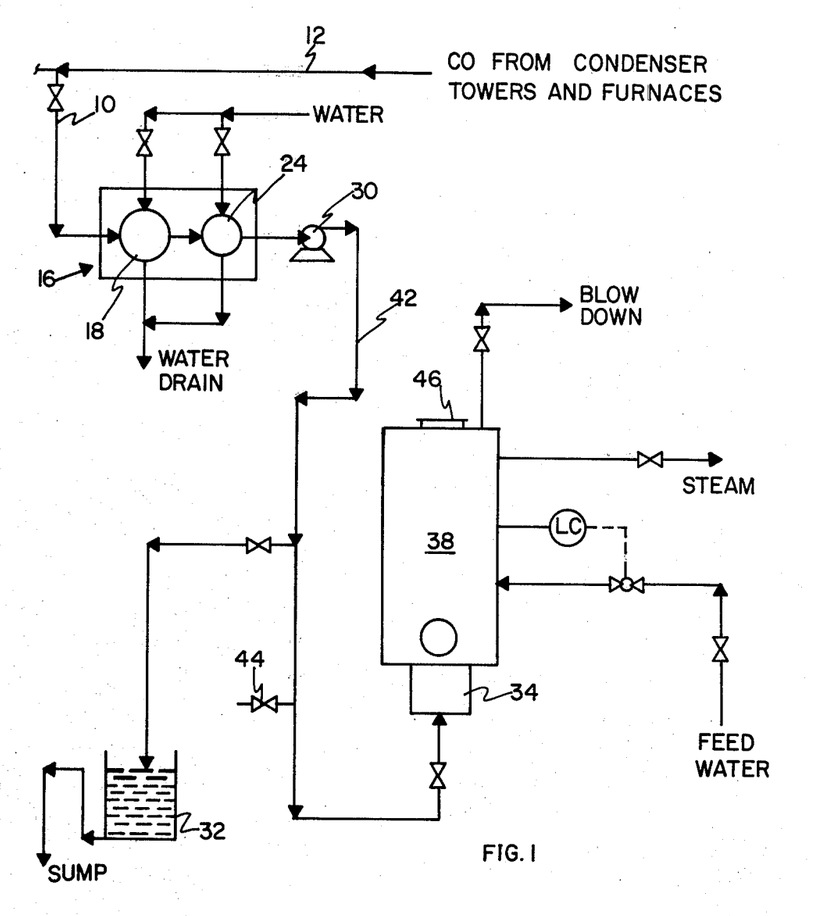
FIG. 1 is a schematic of the test equipment used in the process of this invention.

Referring to FIG. 1, a carbon monoxide gas stream (10) off the main duct line (12) (which normally conveys the gas stream from the furnaces for producing elemental phosphorus) is directed to the scrubbers (16), which include a spray tower (18) and a mist eliminator tower (24).

Figure 2:
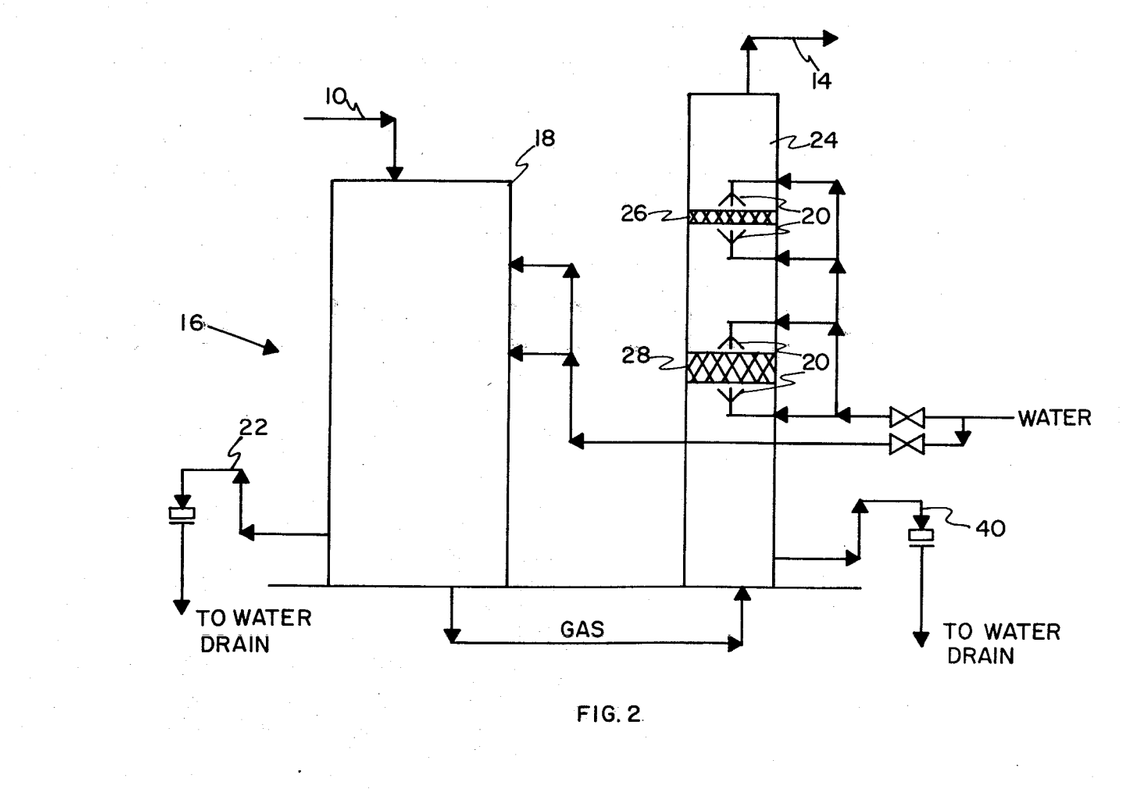
FIG. 2 is a detailed schematic of the scrubbers (16) used in the process of this invention.

Referring more particularly to FIG. 2, the carbon monoxide gas stream (10) is injected into the top of a 316 stainless spray tower (18) which is about 7'2" high (2.18 meters) and 3'6" in diameter (1.06 meters). Four counter-current water sprays (not shown) are used to intimately contact the water with the gases. The sprays have a combined flow of water of 10 gpm (37.85 liters per minute). The water exits through a siphon break (22) 18" (45.7 cm.) above the bottom of the tower (18).

The gas stream then enters the bottom of a 316 stainless steel mist eliminator tower (24). The tower is 9' high (2.74 meters) and 1'4" (0.40 meters) in diameter with four sprays (20). Each of the sprays (20) irrigates one side of master mesh A.C.I. mist eliminator pad (26, 28). The lower pad (28) is 4¾" thick (12.06 cm.) of segmental construction and weighs 7 lbs. (3.175 kg.). The upper mist eliminator (26) is about 1" thick (2.54 cm.) of segmental construction and weighs 3 lbs. (1.36 kg.). The gas enters the bottom of the mist eliminator (24) and exits at the top (14). There is an 18" water siphon brake at the water exit (40).

Referring to FIG. 1, the gas stream upon exiting scrubbers (16) is then pressurized in a stainless steel fan (30). The gas is then conveyed through 4" pipe (42) for about 300 ft. wherein condensed water is dropped out into a drum (32). The gas is then heated and injected into burner (34). Combustible gas (44), i.e. natural gas, may be mixed with the incoming gas stream at the burner (34).

The gas stream is burned in a Farr and Trefts Utility Scotch steam boiler (38) manufactured about 1954. The boiler is a two-pass unit rated at about 1,000 lbs. per hour (38).

A 4" stainless steel gate valve (44) is installed between the 55 gallon water knock out drum and the boiler. This is used to sample the carbon monoxide gas stream for grain loading of phosphorus with a sampling probe.

The first indication of acid condensation is a shiny glaze of liquid condensing on the metal walls of the boiler. This condensate stays in the liquid state for some time, and then sets to a hard glass. The presence of this condensate is the primary indication of too much phosphorus in the fuel.

Acid condensing in the boiler is observed through view port (46) on the end of the boiler. Through the view port (46), the burner flame and the inside of the fire box can be seen.

Another method of determining acid condensation is a dew point probe. This probe is widely used to determine dew point temperatures of sulfuric acid in coal and oil boilers. There is an electrode and a thermocouple in the tip of the probe. When acid condenses on the electrode the increased conductivity is shown on the associated meter in microamps. When the probe is inserted in the boiler stack the probe temperature is slowly lowered while taking conductance readings. Temperature vs. conductance is plotted and the temperature at which the conductance increases rapidly is the dew point temperature, or condensation point.

A second and perhaps better way of using a dew point probe is to take Rate of Acid Build Up (RABU) data. One temperature is held on the probe and conductivity vs time is graphed. An increasing slope indicates that acid is building up on the probe. This means that the probe temperature is under the dew point temperature of the acid. A decreasing or level slope indicates that there is no acid build up, and that the temperature of the probe is above the acids dew point temperature.

To determine the dew point temperatures and rate of acid build up (RABU) a modified Land Acid Dewpointmeter made by Land Pyrometers, Ltd., England is utilized. The Land Pyrometer is inserted into the boiler stack through a 3" brass gate valve. As the dewpoint meter is cooled by running compressed air through the inside of the probe, acid condenses on the tip and can be detected by an electrode. Graphs of conductivity vs. time are constructed. From these graphs, it is possible to determine if acid is condensing and at what temperature.

Carbon Monoxide Gas Stream P4 Loading Tests

Three samples of the carbon monoxide gas stream exiting from the scrubbers were taken at three different scrubber exit temperatures:

TABLE 1

| Scrubber Exit Temperature | Loading gr. P4/SCF (0°C. and 1 Atm.) |
| --- | --- |
| 11.5° C. | .016 |
| 16.5° C. | .032 |
| 23° C. | .067 |

These experimental points when plotted log loading vs. temperature are on a straight line indicating that this curve substantially follows the vapor pressure curve and that the equilibrium vapor pressure value was obtained. At temperatures less than 15° C., the loading is less than 0.025 gr. P4/SCF.

Carbon Monoxide Burning—alone and with natural gas

The following boiler runs were made burning the carbon monoxide gas stream alone:

TABLE 2

| Run | Conditions | Comments |
|---|---|---|
| 1 | 18° C. Scrubber exit temp.; Boiler run overnight; then shut down for 3 days to clean. | Massive acid condensation. Acid set to a hard glass. |
| 2 | 23° C. Scrubber exit temp. | Sample taken for $P_4$ loading. (Table 1) |
| 3 | Off and on CO; 27° C. scrubber exit temp. | White smoke from stack, acid condensing. |
| 4 | 16.5° C. Scrubber exit temp. | Sample taken for $P_4$ loading (Table 1) |
| 5 | 15° C. Scrubber exit temp.; 23 hours. | Acid condensation; white smoke from stack. |
| 6 | 13° C. Scrubber exit temp., | Acid deposited in boiler. |
| 7 | 11.5° C. Scrubber exit temp. | Sample taken for $P_4$ loading (Table 1)., No smoke from stack, slight acid condensation. |
| 8 | 11° C. Scrubber exit temp.; 6½ hour run. | Acid deposited in boiler. |
| 9 | 8.5° C. Scrubber exit temp. | Acid deposited in boiler. |
| 10 | 5° C. Scrubber exit temp.; 6 hour run. | Acid in fire box, not in tubes or stack. |
| 11 | 2° C. Scrubber exit temp.; 2½ hour run. | Acid deposited in firebox. |
| 12 | 3° C. Scrubber exit temp. | Acid deposited in firebox, smoke from stack. |
| 13 | 1° C. Scrubber exit temp. | Acid condensation in firebox, none in tubes or stack. |

All acid determinations were made by observation through view port of any wet, glazed deposits on inside of firebox.

The foregoing results indicate that cooling alone is not adequate to reduce the condensation of acid in the boiler.

When the waste gas was fired in the boiler for the first time, at a scrubber exit temperature of 18° C., massive acid condensation occurred. The large quantity of acid formed indicated that the exit scrubber temperature was too high. Lowering the temperature of the gas to $-2°$ C. still deposited small amounts of acid on the boiler surfaces. The acid seemed to condense first on the coldest part of the boiler, i.e. the water inlet. Inlet water temperature was 140° F. (60° C.). Water temperature in the majority of the boiler was about 336° F. (169° C.) at a saturated steam pressure of 112 psia.

Figure 3:
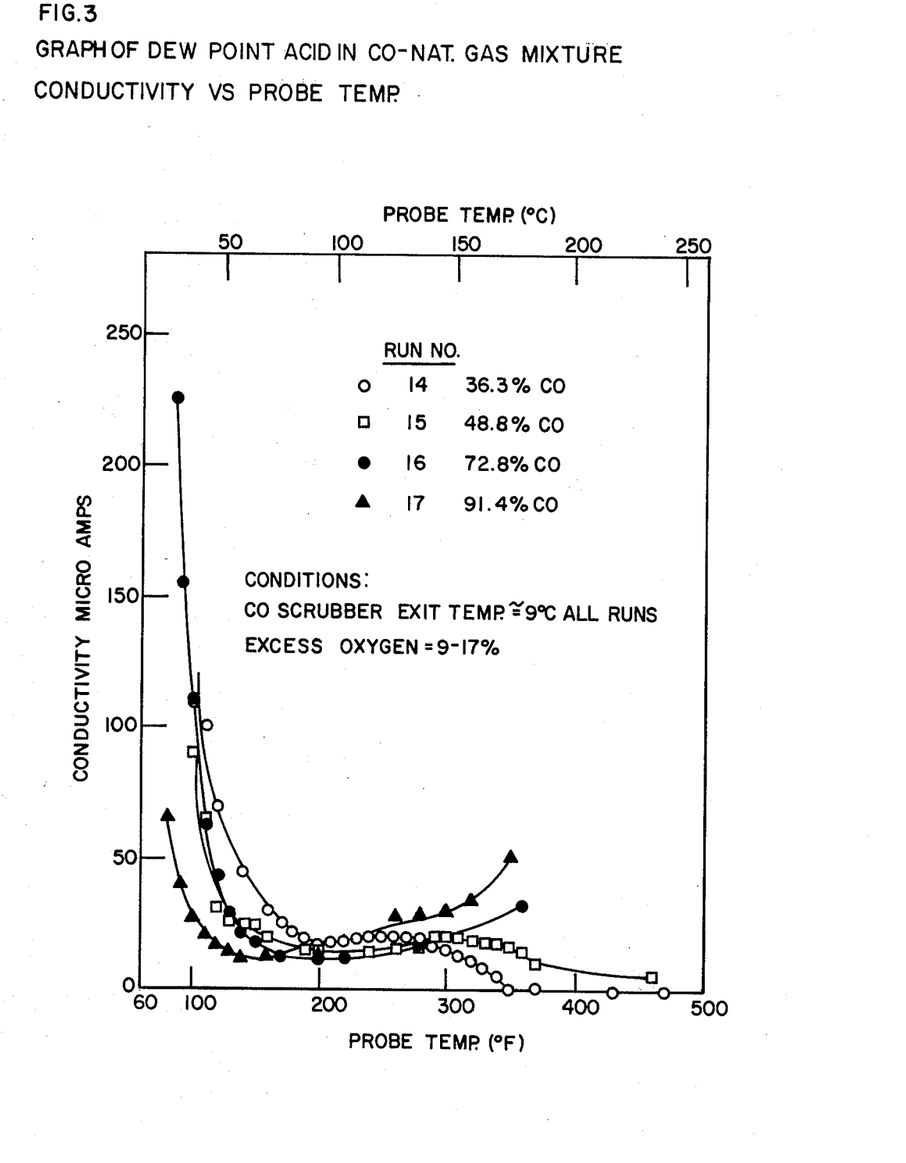
FIGS. 3 through 12 are graphs of test results in Conductivity (microamps) vs. Temperature (FIGS. 3–5) and Conductivity vs. Time (FIGS. 6–12) used in determining the temperature at which the acid contained in the combustion zone will condense on the metallic surfaces. These tests will be explained in detail in the "Examples" section of this specification.

After visual observation of these first runs using the carbon monoxide gas stream alone, the dewpointmeter was used to determine acid condensation rates and temperatures. The voltage used on the probe was 20V, unless noted otherwise. FIG. 3 shows the first attempts to get a dew point temperature at differing carbon monoxide concentrations using a combustible gas, i.e. natural gas as a diluent.

Figure 4:
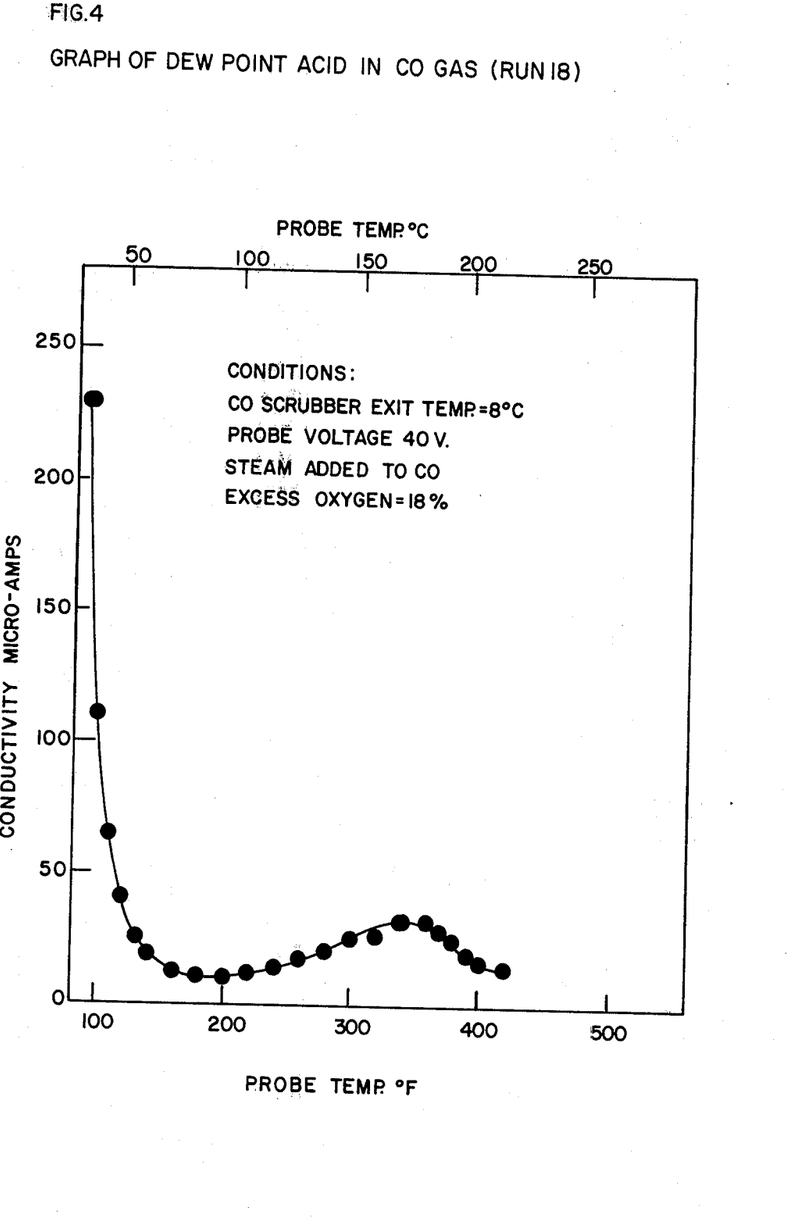
Figure 5:
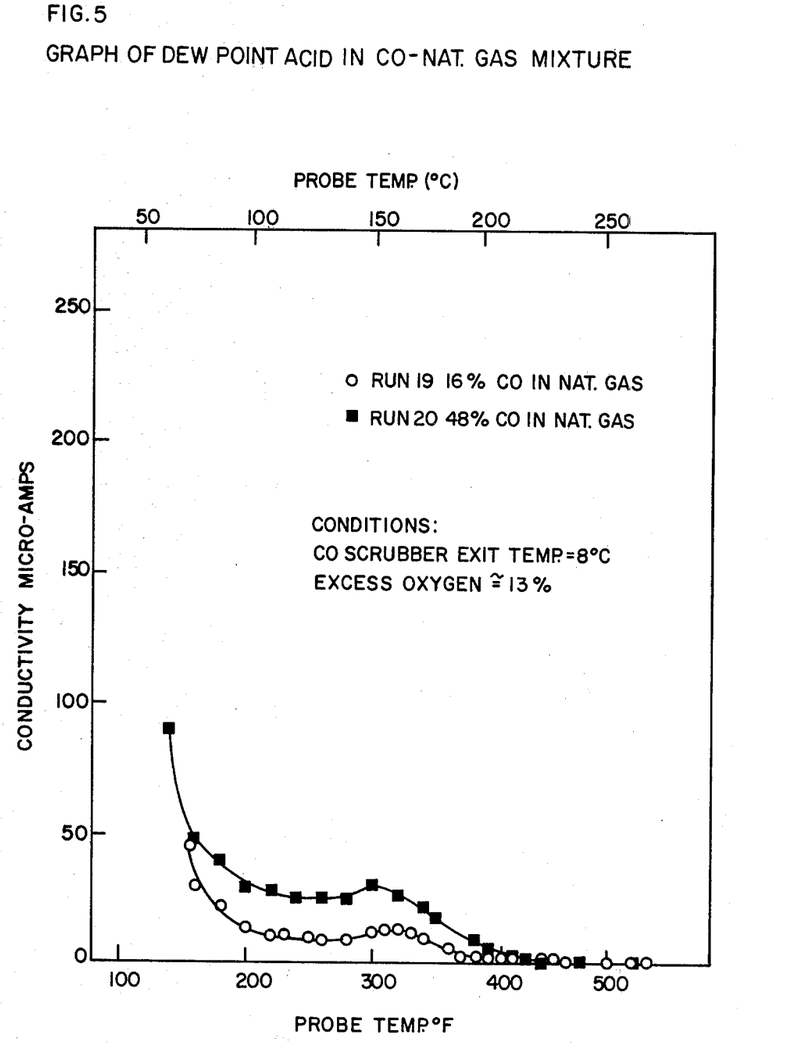

Run 14 lasted 20 minutes; Run 15–20 minutes; Run 16–11 minutes; and Run 17 lasted 9 minutes. This method of dew point analysis did not work well. A high condensation of acid is required to obtain a definite dew point temperature by such graphing of conductivity vs. temperature. FIGS. 3, 4 and 5 do not show sudden increases in conductivity due to acid condensation. Instead they show slight conductivity increases in the 300° F. (149° C.) range and around 90° F. (32.2° C.—the water dew point) with decreasing conductivity readings in between.

Figure 6:
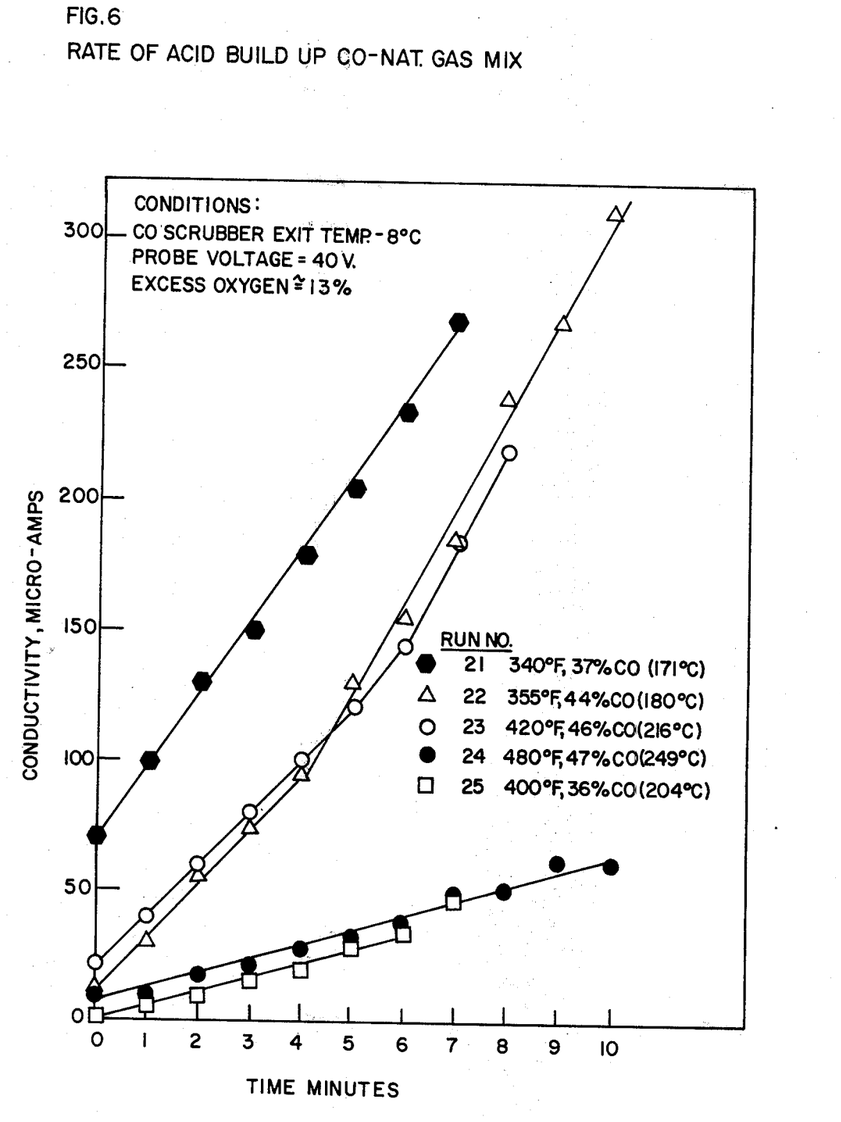

Some researchers believe that Rate of Acid Build Up (RABU) tests are a better method of analysis (Boiler Flue Gas measurement Using a Dewpoint Meter, N. D. Childs and G. D. Clark, ASME paper 63-WA-109, Nov. 1963, pp. 8–12.). FIG. 6 shows RABU curves. An increasing slope indicates that the acid is building up on the probe; and the greater the slope the more rapid the acid build up. A decreasing or level slope indicates no acid build up on the probe. Generally higher temperatures show slower rates of acid build up (in microamps per minute) and lower temperatures show more rapid acid build up. These RABU curves are apparently affected by the amount of phosphorus entering the boiler. All RABU curves in FIG. 6 show acid building up on the probe, an undesirable condition.

Figure 7:
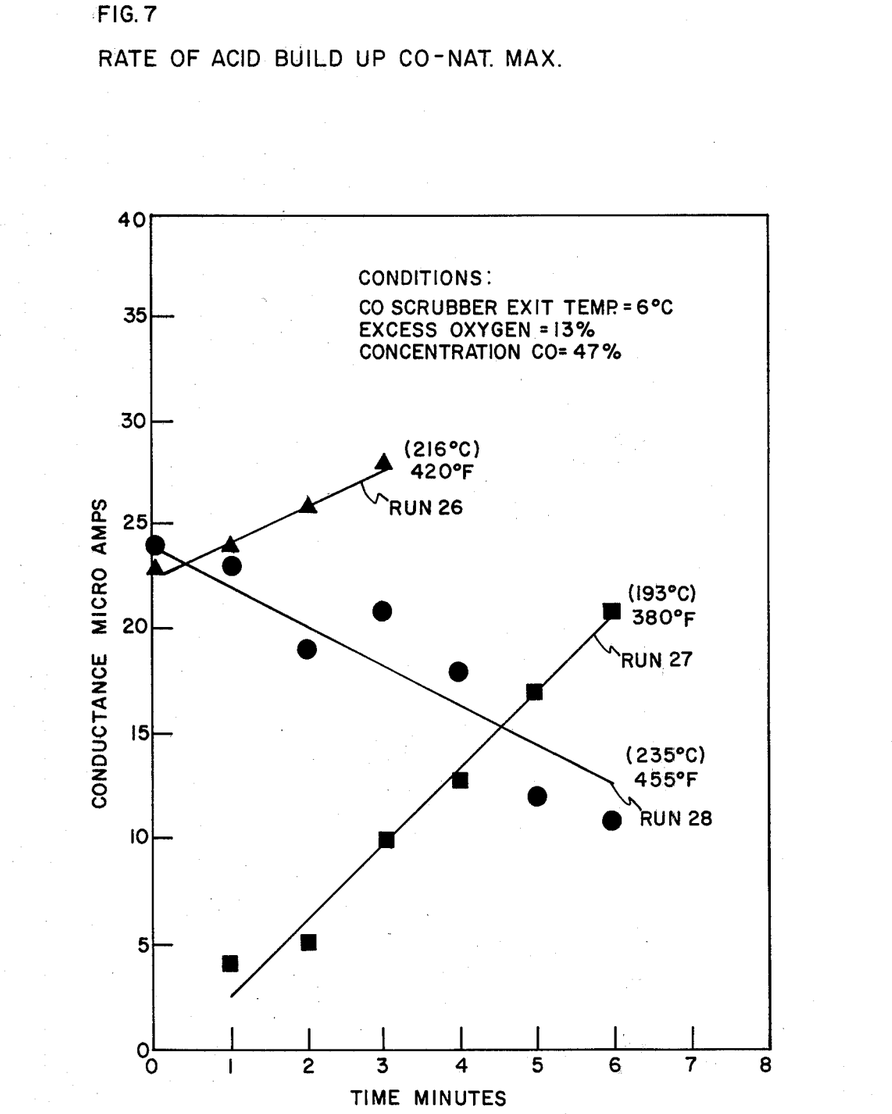

FIG. 7 shows a decreasing RABU curve for 455° F. (235° C.) probe temperature, and scrubber exit temperature of the gas stream was 6° C., and there was a ratio of 47% CO to 53% natural gas (by volume). At these conditions a boiler could safely run at a steam pressure of 444 psia. 455° F. (235° C.). The concentration of phosphorus in the inlet gas is estimated to be 0.0085 gr. $P_4$/SCF. The concentration of phosphorus in the flue gas was $5.15 \times 10^{-4}$ gr. $P_4$ per SCF. of flue gas. As indicated in FIG. 7, temperatures of 420° F. (216° C.) and 380° F. (193° C.) will condense phosphorus from the flue gas at the aforementioned conditions.

Carbon Monoxide Burning—MgO Addition

Approximately 1½ pounds of magnesium oxide (MgO) was mixed with 1 gallon of water and sprayed into the burners flame. This slurry plugged the small spray nozzle after 8 minutes. Initial RABU curves were excellent, i.e. downward sloping, indicating no or only low acid buildups. The test was too short to be conclusive.

Figure 8:
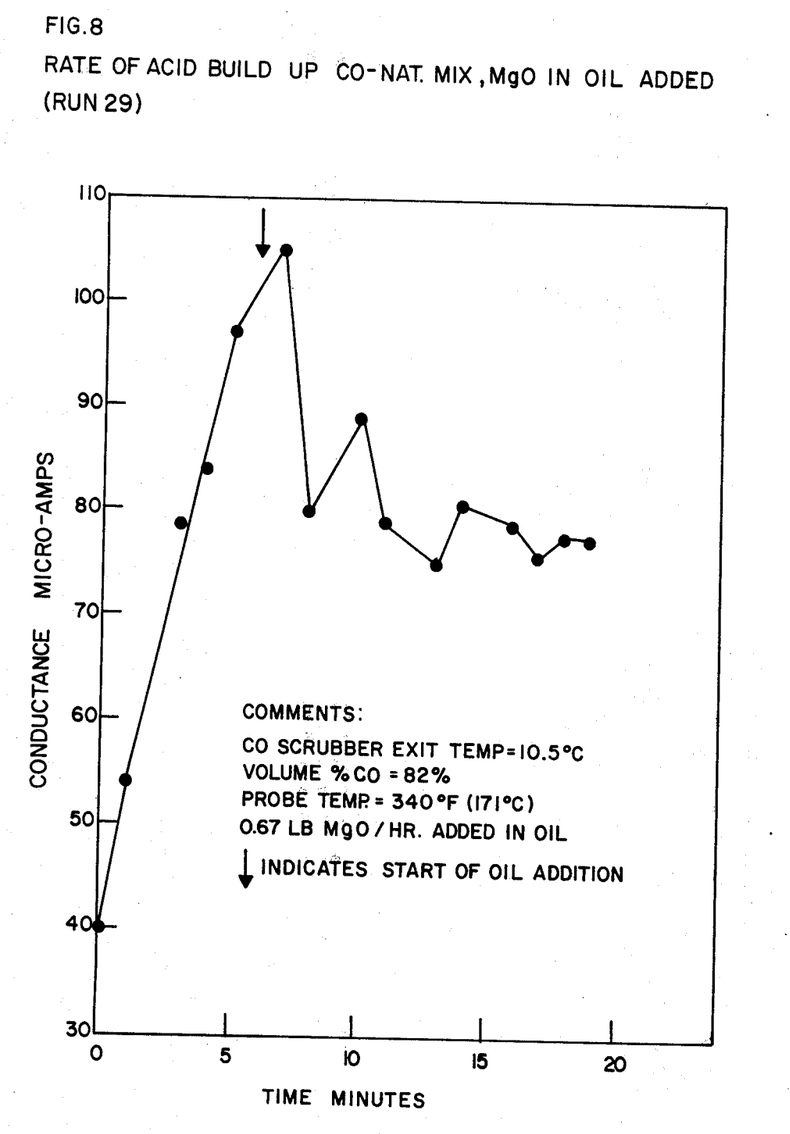

A solution of 1½ pounds of MgO in 1 gallon of No. 2 fuel oil (COMBUSTROL from Calgon Corporation) was then sprayed into the burner flame (0.67 lb. MgO/hr.). FIG. 8 shows that immediately after the solution was added the slope of the RABU curve decreased sharply and leveled off. This indicates that the acid was neutralized by this solution and became nonconductive.

Figure 9:
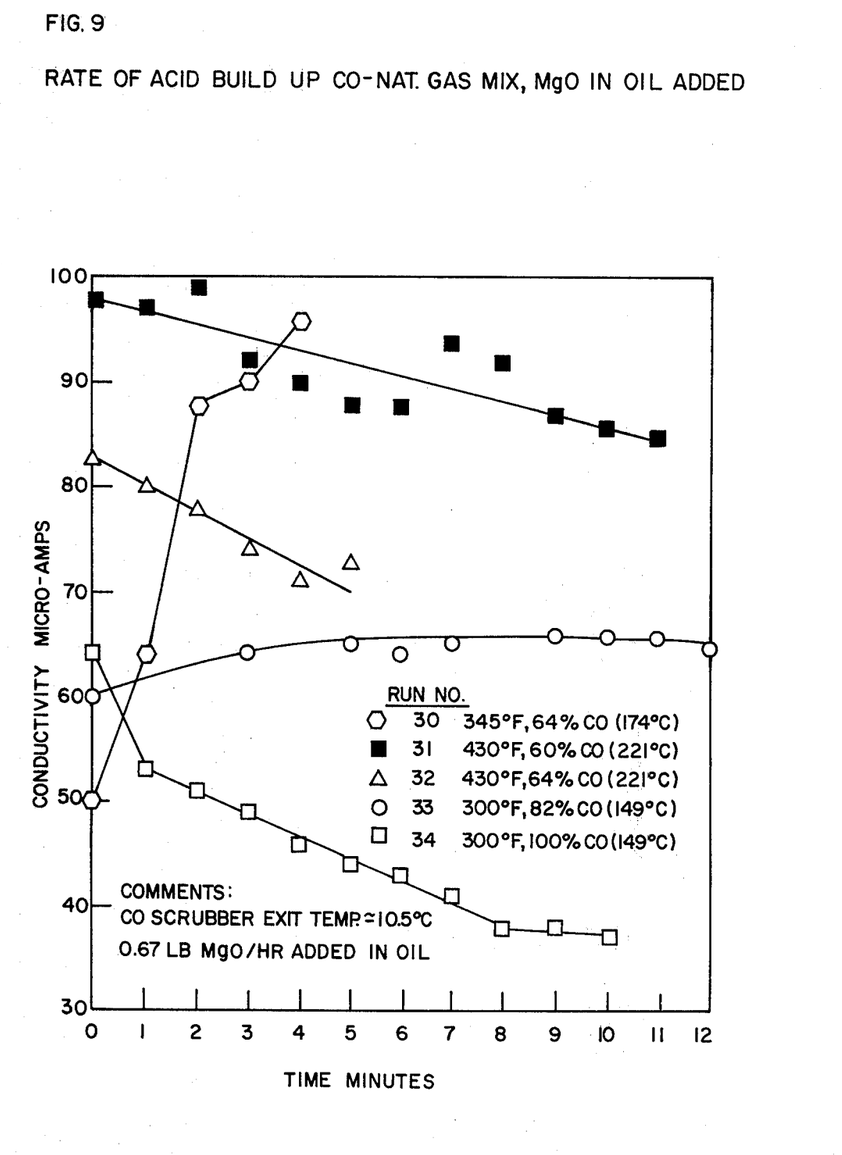

FIG. 9 indicates that at almost all temperatures this MgO oil siolution neutralized the acid formed. The only exception was the test using 64% CO at 345° F. (174° C.). This test was very short but showed increasing RABU values, an indication of acid build up.

Figure 10:
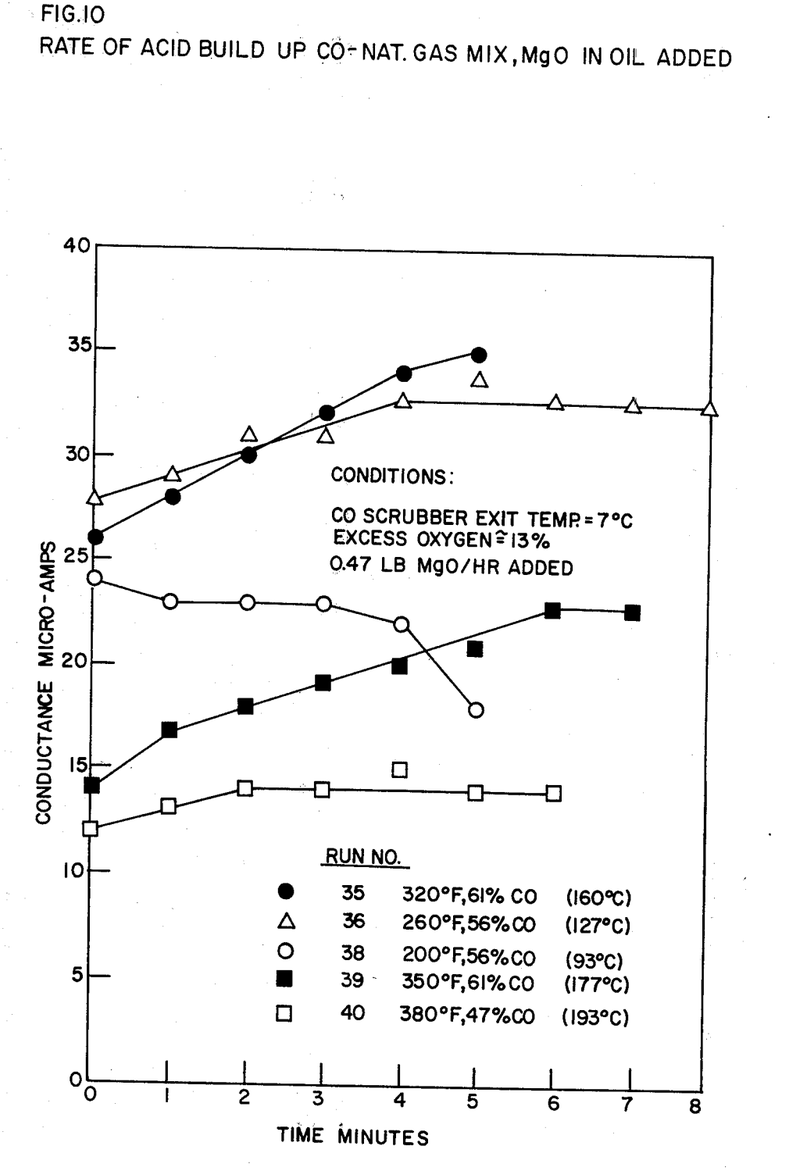

The amount of MgO oil solution injected into the flame was decreased to 0.47 lb. MgO/hr. (FIG. 10). Most of the RABU curves increased in slope and then leveled off. This indicates that the acid took a longer time to be neutralized. The test at 320° F. (160° C.) did not level off for the test had to be prematurely terminated.

Figure 11:
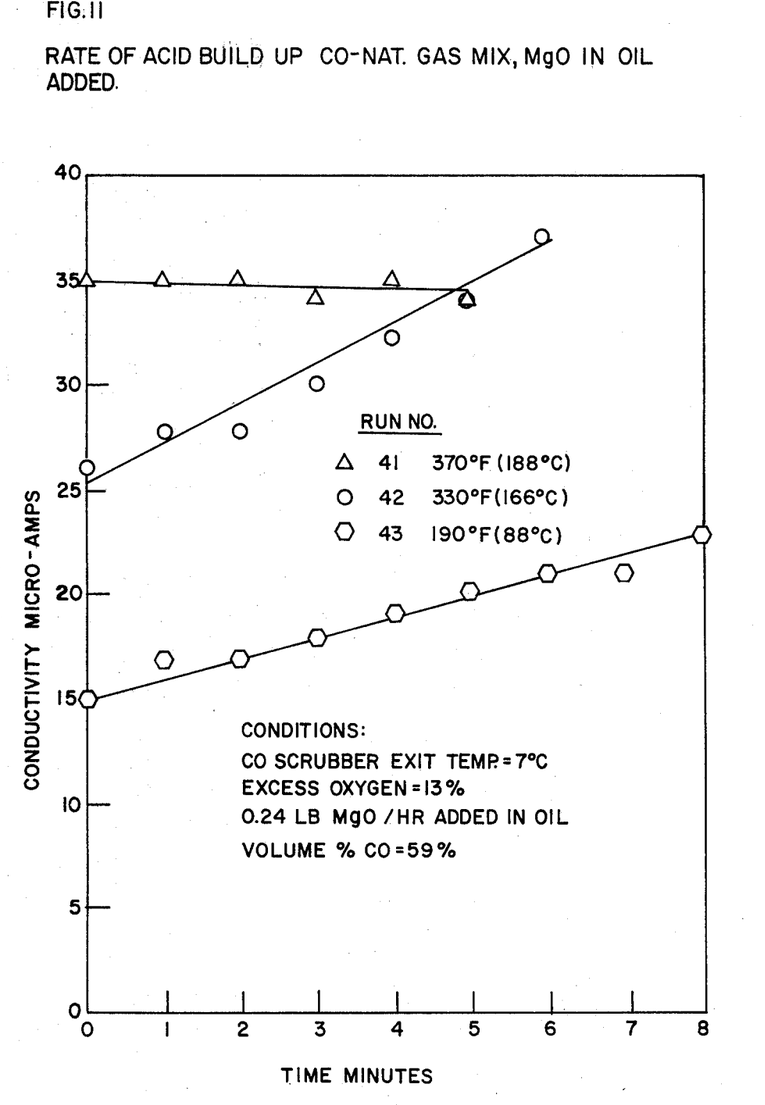

The addition of MgO in oil was decreased to 0.24 lb. MgO/hr. (FIG. 11). Only the higher probe temperatures have an acceptable RABU slope. This marks the lower limit of the MgO rate of addition using this method.

Figure 12:
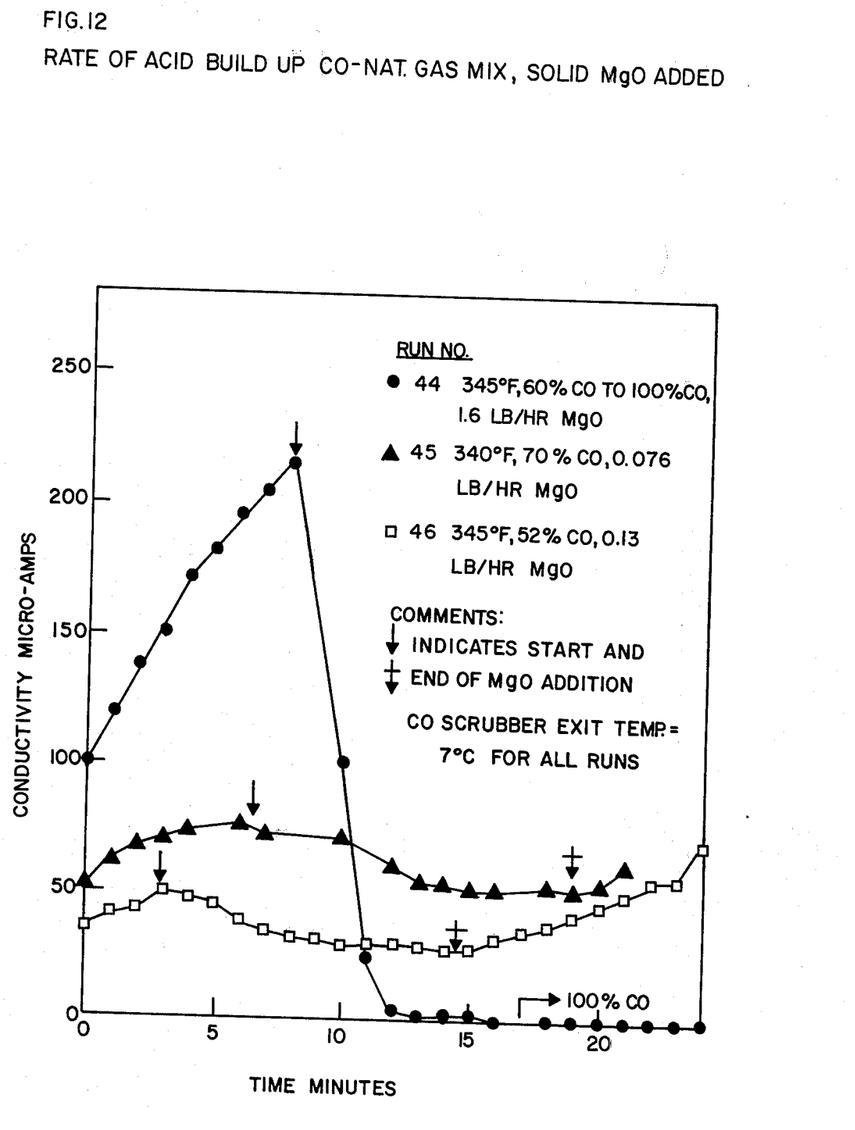

FIG. 12 shows the results of injecting powdered MgO into the forced-draft fan of the burner. This worked exceptionally well and decreasing RABU slopes were obtained below the MgO rate of addition used in developing FIG. 11 (0.24 lbs. MgO/Hr.). The lowest rate of addition for this method of injection was 0.076 lbs. MgO/hr. at 340° F. (171° C.) and 70% CO.

The 0.076 lb. MgO/hr. rate of addition is 18.2 times the estimated quantity of that needed to completely neutralize meta-phosphoric acid produced from the incoming elemental phosphorus. The rate of 0.13 lbs. MgO/hr. corresponds to ratio of 42:1; and 1.6 lbs. MgO/hr. to 312:1. The addition of large amounts of MgO caused increased ash deposits in the boiler.

Ash samples were taken from the boiler tube and stack areas running with and without MgO addition. Two samples taken without MgO addition had a pH of 1.5 and 1.9.

After the tests with MgO addition were complete, a sample was taken from the same spots on the boiler. These samples had a pH of 5.4. Anything above a pH of about 4 is generally considered non-corrosive. This confirms the fact that neutralization of the acid was taking place. Additional samples were taken at different places in the boiler, these further confirmed that the acid was being neutralized.

CONCLUSIONS

The scrubbers used in these tests did an excellent job in reducing the elemental phosphorus in the carbon monoxide gas stream. Despite this excellent elemental phosphorus removal it was not possible, absent MgO addition or dilution with natural gas, to burn 100% carbon monoxide without depositing metaphosphoric acid in the boiler. Scrubbing exit temperatures of $-2°$ C. were used in attempting to accomplish this.

The best way to determine if acid was condensing at selected temperatures was to generate Rate of Acid Build Up (RABU) curves. Any increasing slope of a RABU curve indicated a build up of acid. When natural gas was added to the carbon monoxide gas stream, a decreasing slope of the RABU curve occurred at a carbon monoxide volume of 47%, 455° F. (235° C.) probe temperature and a scrubber temperature of 6° C.

The tests indicate that if enough elemental phosphorus was removed from the carbon monoxide gas stream the boiler could be run on pure carbon monoxide, without any additives, e.g. natural gas or MgO. This would, however, require scrubber exit temperatures of below zero degrees C., an impractical situation.

Several ways were tried to dilute or neutralize the acid formed. The most successful one was adding powdered magnesium oxide (MgO) to the incoming air. This neutralized the acid formed and permitted burning with a 100% carbon monoxide gas stream at scrubber exit temperatures of 70° C.

It is evident from the foregoing tests that an ordinary boiler can be run on elevated phosphorus contaminated carbon monoxide gas stream with no acid buildup problems. The carbon monoxide gas must be well scrubbed with water, preferably to scrubber exit temperatures below 15° C., then magnesium oxide is injected into the boiler flame and/or the gas stream is diluted with combustible gas.

What is claimed is:

1. A process for reducing the tendency of a carbon monoxide gas stream, containing a minor level of elemental phosphorus, to corrode metallic surfaces in a combustion zone upon combustion of the gas stream in the combustion zone to combustion gases comprising, prior to combustion:
    (a) cooling the gas stream to a sufficiently low temperature to condense a quantity of elemental phosphorus to produce a reduced level of elemental phosphorus in the gas stream; and
    (b) diluting the gas stream with an effective amount of combustible gas, wherein the effective amount of combustible gas is an amount which is effective in producing a dew point of the combustion gases, with respect to the quantity of acid produced by the combustion of the reduced level of elemental phosphorus, less than the temperature of the metallic surfaces.

2. The process of claim 1, further comprising injecting into the combustion zone during combustion an effective amount of MgO or a compound capable of yielding MgO to neutralize the quantity of acid produced by the combustion of the reduced level of elemental phosphorus.

3. The process of claim 1 or 2, wherein the low temperature to which the gas stream is cooled to less than about 15° C.

4. The process of claim 1 or 2, wherein the cooling step is performed by intimately contacting the gas stream with cooling water.

5. The process of claim 1 or 2, wherein the cooling step is performed by intimately contacting the gas stream with cooling water and then passing the gas stream through at least one mist eliminator pad.

6. The process of claim 1 or 2, wherein the combustible gas is natural gas.

7. The process of claim 1 or 2, wherein the ratio of the combustible gas to the carbon monoxide stream, by volume, is about 0.25:1 to about 3:1.

8. The process of claim 1 or 2, wherein the gas stream is produced in the electrothermal production of phosphorus.

* * * * *